United States Patent
Krapf

(10) Patent No.: US 7,263,709 B1
(45) Date of Patent: Aug. 28, 2007

(54) SYSTEM FOR DISPLAYING VIDEO DATA HAVING A PROMOTION MODULE RESPONSIVE TO A VIEWER PROFILE TO ENTICE A VIEWER TO WATCH A PREMIUM CONTENT

(75) Inventor: Russell M. Krapf, Dana Point, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 1105 days.

(21) Appl. No.: 09/608,819

(22) Filed: Jun. 30, 2000

(51) Int. Cl.
*G06F 3/00* (2006.01)
*G06F 13/00* (2006.01)
*H04N 5/445* (2006.01)

(52) U.S. Cl. ............... 725/46; 725/34; 725/55; 725/58; 725/134; 725/142

(58) Field of Classification Search ............ 725/39, 725/44, 45, 46, 47, 61, 42, 55, 58, 34, 133–134, 725/141–142, 153
See application file for complete search history.

(56) References Cited

U.S. PATENT DOCUMENTS

| | | | |
|---|---|---|---|
| 5,446,490 A | | 8/1995 | Blahut et al. |
| 5,530,754 A | * | 6/1996 | Garfinkle ................. 725/8 |
| 5,790,935 A | | 8/1998 | Payton |
| 5,796,828 A | * | 8/1998 | Tsukamoto et al. ........ 380/203 |
| 5,798,785 A | | 8/1998 | Hendricks et al. |
| 5,977,964 A | * | 11/1999 | Williams et al. ............ 345/721 |
| 6,029,045 A | * | 2/2000 | Picco et al. .................. 725/34 |
| 6,088,722 A | | 7/2000 | Herz et al. |
| 6,163,316 A | * | 12/2000 | Killian ................. 345/721 |
| 6,177,931 B1 | * | 1/2001 | Alexander et al. ............ 725/52 |
| 6,314,575 B1 | * | 11/2001 | Billock et al. ................. 725/87 |
| 6,425,128 B1 | * | 7/2002 | Krapf et al. .................. 725/37 |
| 6,483,523 B1 | * | 11/2002 | Feng .......................... 345/745 |
| 6,588,013 B1 | * | 7/2003 | Lumley et al. ............... 725/32 |
| 6,590,979 B1 | * | 7/2003 | Ryan ......................... 380/210 |
| 6,684,194 B1 | * | 1/2004 | Eldering et al. ............. 705/10 |
| 2001/0029610 A1 | * | 10/2001 | Corvin et al. ................ 725/42 |
| 2002/0056099 A1 | * | 5/2002 | Takahashi et al. ............ 725/39 |
| 2003/0131356 A1 | * | 7/2003 | Proehl et al. ................ 725/58 |

OTHER PUBLICATIONS http://www.mbtv.com/technology.htm.
http://www.mbtv.com/ptv.htm.
http://www.mbtv.com/digital_vcr.htm.
http://www.mbtv.com/pde.htm.
http://www.tivo.com/what/tour.html.
PCT Written Opinion dated Jul. 25, 2002; PCT/US01/20059.

* cited by examiner

*Primary Examiner*—Ngoc Vu
(74) *Attorney, Agent, or Firm*—Knobbe, Martens, Olson & Bear

(57) ABSTRACT

A video system has an input port to receive video data that includes a plurality of premium contents and has an output port to couple to a video display for displaying video data selected by a viewer. A preference engine is coupled to the input port and is configured to track viewer selections of the video data and to create a viewer profile representing viewing preferences of the viewer. A promotion module, which is coupled to the preference engine and the output port, is responsive to the viewer profile to select at least one preferred promotion content from the plurality of premium contents, to cause the selected preferred promotion content to be stored and to cause the selected preferred promotion content to be displayed to entice the viewer to watch a premium content associated with the selected preferred promotion content.

25 Claims, 3 Drawing Sheets

SYSTEM FOR DISPLAYING VIDEO DATA HAVING A PROMOTION MODULE RESPONSIVE TO A VIEWER PROFILE TO ENTICE A VIEWER TO WATCH A PREMIUM CONTENT

BACKGROUND OF THE INVENTION

1. Field of the Invention

The invention relates to a system for displaying video data. More particularly, the invention relates to a system and a method for displaying video data that increases the likelihood that a viewer watches a premium content.

2. Description of the Related Art

A conventional system for displaying video data includes a monitor or a television (TV) set connected to a set top box. The set top box is connected through a coaxial cable to a cable TV network or a satellite dish for "satellite TV." The TV set and the set top box are located, for example, in a viewer's home and receive a multitude of TV channels from a broadcast head end, wherein each TV channel has a multitude of programs during a typical day. In order to select and watch a certain program, the viewer usually uses a remote control to control at least the set top box to tune to a desired channel. The TV set receives a video signal from the set top box and displays the program of the desired channel.

Depending on how the system is configured, the viewer can activate the set top box and the TV set separately, or activate only the set top box, which then activates the TV set. If the viewer turns the set top box off after a viewing session, the set top box tunes to a default channel when the viewer turns the set top box on again. The default channel may be the last channel the viewer watched during a previous viewing session, or a pre-selected channel tuned to a head end start-up channel. Other viewers may prefer leaving the set top box always on and turning only the TV set on and off. Thus, when a viewer turns on the TV set, the TV set displays as the default channel the last channel the viewer watched.

A viewer may expand the system by connecting a video recorder to the TV set and the set top box in order to overcome the rigid scheme according to which the programs are broadcast. A viewer, thus, can personalize television viewing by recording a program and watching it when it is convenient for the viewer. The video recorder may be a digital video recorder that includes a hard disk drive with a storage capacity of between 10 GB and 30 GB for recording of up to 30 hours of television programming.

In addition to using a video recorder, alternative systems provide for even more flexibility and viewer-specific television. For example, the digital video recorders (also referred to as personal video recorders) offered by Replay Networks in combination with ReplayTV service and offered by Philips in combination with TiVo service allow the viewer to personalize television viewing. For instance, the personal video recorder can learn a viewer's preferred programs and automatically record programs it expects a viewer to like. The viewer can also, among other activities, watch and pause live TV. That is, the viewer can pause a favorite show when someone calls and pick up the show again exactly where the viewer left off.

Furthermore, the conventional system may enable the viewer to subscribe to and receive premium content such as subscription channels, pay-per-view services or video-on-demand services in order to watch a movie on a certain day and at a time of day for which the viewer has to pay a per-movie fee. Providers of these services, of course, want to attract as many viewers as possible so that the providers also advertise for their services and specific contents such as movies. For example, video clips or trailers for movies are broadcast on the subscription channels and the pay-per-view channels, or are added as commercials to the other broadcast channels. Personalized television and the increasing number of broadcast channels, however, may defeat the advertisers' objectives because the trailers or commercials may be buried by the multitude of broadcast channels.

There is therefore a need to improve upon the prior art technique for displaying video data so that it is more likely that an interested viewer in fact watches the premium content.

SUMMARY OF THE INVENTION

The present invention may be regarded as a video system. The video system has an input port to receive video data that includes a plurality of premium contents, and an output port to couple to a video display for displaying video data selected by a viewer. A preference engine is coupled to the input port and configured to track viewer selections of the video data and to create a viewer profile representing viewing preferences of the viewer. A promotion module, which is coupled to the preference engine and the output port, is responsive to the viewer profile to select at least one preferred promotion content from the plurality of premium contents, to cause the selected at least one preferred promotion content to be stored, and to cause the selected at least one preferred promotion content to be displayed to entice the viewer to watch a premium content associated with the selected at least one preferred promotion content.

Further, the present invention may be regarded as a method of operating a video system that receives video data that includes a plurality of premium contents. The method creates a viewer profile representing viewing preferences of a viewer and identifies at least one of the premium contents consistent with the viewer profile. The method selects a promotion content associated with the identified at least one of the premium contents, stores the selected promotion content, and displays the selected promotion content to entice the viewer to watch the associated at least one of the premium contents.

The present invention, thus, provides for an increased likelihood that an interested viewer knows about a certain premium content and then in fact watches the premium content.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENT

Figure 1:
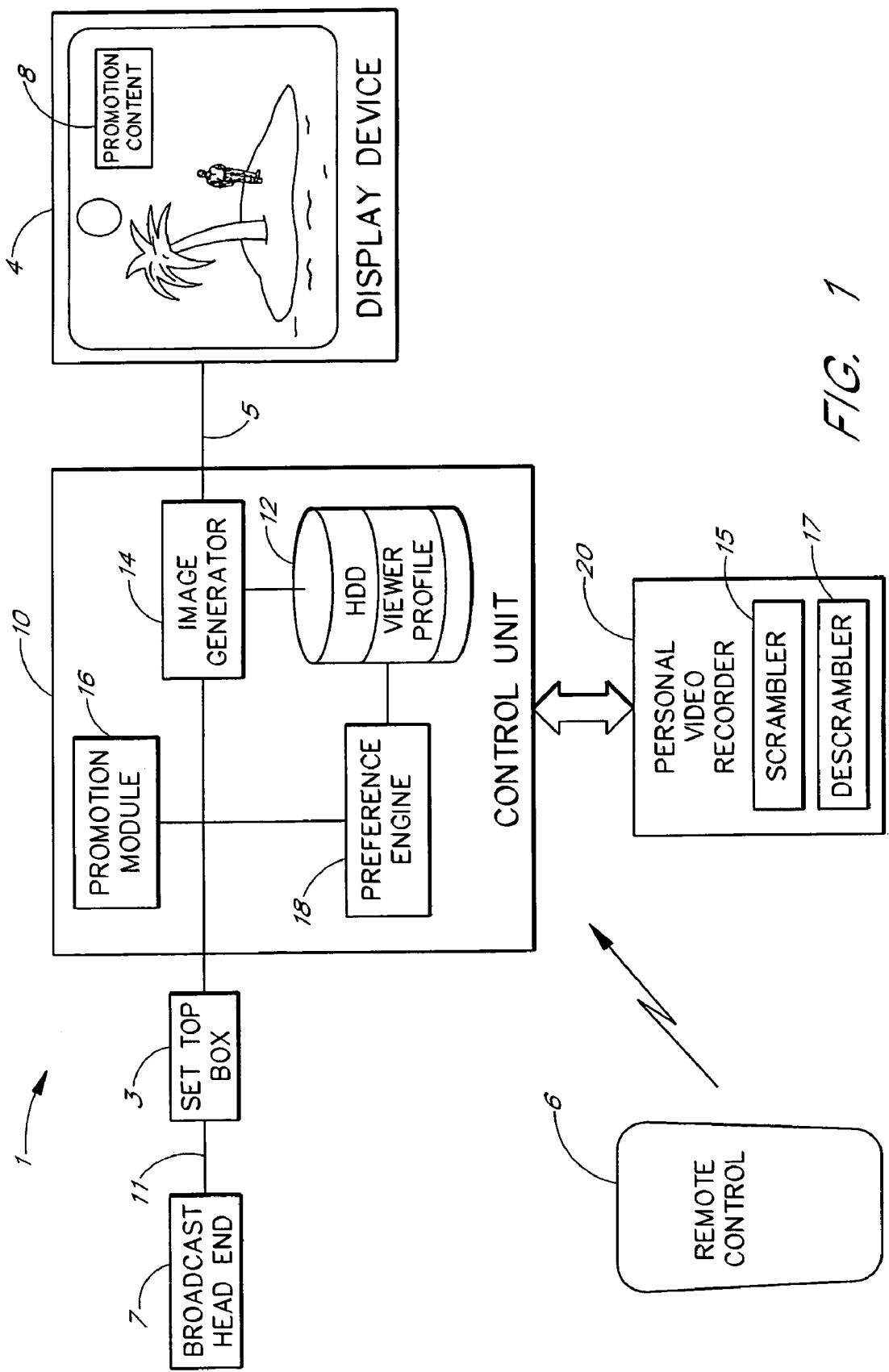
FIG. 1 shows a system for displaying video data in accordance with an embodiment of the present invention that includes a set top box and a control device connected to a display for displaying video data and a promotion content selected by a promotion module from a plurality of premium contents using a viewer profile created by a preference engine.

FIG. 1 shows an embodiment of a system 1 for displaying video data in accordance with an embodiment of the present invention. The exemplary system 1 includes a set top box 2, a display 4, a personal video recorder 20, a remote control 6 and a control device 10, which are usually located within a viewer's home. It is contemplated that in another embodiment the control device 10 may be implemented within the set top box 2 or the personal video recorder 20. For illustrative purposes, however, the control device 10 is hereinafter a separate device to which the personal video recorder 20 is coupled, for example, through a communications bus such as a universal serial bus (USB) and appropriate interface circuits. As described below, the personal video recorder 20 includes a scrambler 15 and a descrambler 17. A cable 11 connects the set top box 2 to a satellite dish for satellite TV or to a remotely located broadcast head end 7, as shown in FIG. 1, which may be a part of a cable TV network. A line 3 connects the set top box 2 to an input of the control device 10, and a line 5 connects an output of the control device 10 to the display 4.

The display 4 may be a TV, a computer monitor or any other display for displaying video data. As described below in greater detail, the display 4 also shows a section for promotion content 8, which the viewer may select at the beginning of or during a viewing session. The promotion content 8 is selected from premium contents provided by the broadcast head end 7 or pre-recorded premium content from the personal video recorder 20. As illustrated in FIG. 1, the promotion content 8 appears as a banner or a "picture-in-picture" within the display 4 to entice a viewer to select and watch the premium content represented by the promotion content 8. The "picture-in-picture" may include a video clip, a trailer, a listing of the actors of a program and pictures of the actors, a bibliographic listing with the title of a program, a program description and program reviews, or a combination of these options.

The broadcast head end 7 provides broadcast video data that includes a multitude of channels with a multitude of programs having audio and video data. The broadcast head end 7 further enables the viewer to subscribe to and receive one or more conditional access video contents such as the contents of subscription channels, video-on-demand services or pay-per-view services that provide a plurality of premium contents. Upon payment of a fee, the condition is fulfilled and the viewer can access and watch the selected video content. The format of the broadcast video data and the premium contents may be in accordance with known video/television formats such as NTSC, PAL, S-Video or the like.

The exemplary control device 10 includes a storage device 12, an image generator 14, a promotion module 16 and a preference engine 18. The preference engine 18 is a software module configured to learn a viewer's watching preferences by monitoring the viewer's viewing pattern. The preference engine 18 uses the viewing pattern to create a viewer profile. It is contemplated that the preference engine 18 may create viewer profiles for more than one viewer, for example, for each family member. Thus, the viewer-specific viewer profile represents the contents and channels this viewer prefers and on which day and at what time of a day this viewer watches a specific content. In the illustrated embodiment, the preference engine 18 is located within the control device 10. Those skilled in the art, however, will appreciate that the preference engine 18 may further be located within the set top box 2 or within the personal video recorder 20. In one embodiment, the preference engine is a software module that is commercially available from Metabyte Networks, Inc.

The storage device 12 may be a hard disk drive (HDD) that stores data representing the viewers' viewing preferences and viewing patterns, i.e., viewer profiles. The storage device 12 shown in FIG. 1, therefore, includes a section "Viewer Profile" for illustrative purposes. For instance, the viewing preferences may be categorized based on broadcast content, such as sports, entertainment, news, and movies, or based on sources for certain viewing preferences, such as preferred TV channels and premium contents including one or more subscription channels, one or more pay-per view channels, one or more video-on-demand channels, or a combination thereof. In addition, the viewing preferences may include other categories such as advertising, infomercials, catalogs, or Internet content, which is accessible, for example, via a modem. The control device 10 may update the viewing preferences depending on the viewer's actual preferences or, for example, depending on whether or not it is the season for a certain sports event. The control device 10, therefore, enables the menu to have a "learning" capability for adjusting to each viewer's viewing preferences.

The promotion module 16 is coupled to the preference engine 18 and the image generator 14. By using the viewing preferences created by the preference engine 18 for a specific viewer, the promotion module 16 selects from the plurality of premium contents promotion contents that correspond to the preferred contents of this viewer. The preferred promotion contents may be stored, i.e., pre-recorded within the promotion module 16 or on the storage device 12. For instance, when the viewing preferences indicate that the viewer prefers sports, the promotion module 16 selects "sports" from the stored promotion contents and causes display of the promotion content 8 (e.g., "sports") to entice the viewer.

The promotion module 16 may generate a video clip or a trailer as the promotion content 8 for a preferred premium content. In another embodiment, the broadcast head end 7 may broadcast a video clip or a trailer together with a respective premium content so that promotional material is assigned to each premium content. The storage device 12 or the personal video recorder 20 may then pre-record a plurality of premium contents with assigned promotional materials. Alternatively, the broadcast head end 7 may broadcast a video clip or a trailer before the respective premium content is sent. For instance, the video clip may be sent a few days before the scheduled broadcast day of the premium content and recorded on the storage device 12. On the scheduled broadcast day, for example, prior to the scheduled time, the control device 10 may then cause the display of the pre-recorded video clip to entice the present viewer to select the premium content. Likewise, in case the premium contents are already pre-recorded, the control device 10 may display at least one of the corresponding promotion contents 8 randomly during the present viewer's viewing session to entice the present viewer to watch one of the pre-recorded premium contents.

When the viewer turns the display 4 on, the control device 10 causes the display of the promotion content 8 on the display 4. In addition, the promotion module 16 may cause the display of more than one promotion content 8 on the display 4 to offer the viewer several premium contents. The promotion content 8 may be displayed simultaneously with "regular" broadcast content or shortly after the broadcast content has been displayed in order to entice the viewer to watch the promotion content. Should the viewer decide to watch the premium content, the viewer needs to pay or authorize payment of the required fee before the premium content can be displayed on the display 4.

The personal video recorder 20 includes a storage device, such as a hard disk drive (HDD) with a storage capacity of between 10 GB and 30 GB to selectively store and, thus, record video content in digital form. The storage device may store up to 30 hours of compressed video and audio data. The compression is often achieved by using a standardized process defined by the Moving Picture Expert Group (MPEG), e.g., MPEG-2.

The system 1 may be configured to transmit the premium content from the broadcast head end 7 to the set top box 2 only when the viewer has paid the appropriate fee. In this case, the viewer may immediately watch the premium content (e.g., a complete movie), record it with the personal video recorder 20, or watch and record it at the same time. In an alternative embodiment, the system 1 may be configured to transmit the premium content and to record it on the personal video recorder 20 before the viewer pays. In this case, the personal video recorder 20 "releases" the premium content only when the viewer paid the fee.

One way of ensuring that the personal video recorder may "release" the premium content is to scramble and to de-scramble the premium content. The scrambler 15 may scramble the premium content, i.e., to distort the video data with a predefined scramble function, prior to recording on the personal video recorder 20 in order to secure the premium content from unauthorized viewing. The scrambled premium content is of no use outside the personal video recorder 20. The descrambler 17 de-scrambles the premium content, i.e., to apply an inverse scramble function to restore the original video data, only when the viewer has paid the required fee. In addition, the scrambler 15 and the descrambler 17 protect the premium content from multiple copying because only the personal video recorder 20 can de-scramble the premium content. The scrambled premium content, thus, cannot be played by another personal video recorder.

The image generator 14 may access the storage device 12 and retrieve one of several stored viewing preferences to generate an image of the promotion content 8, preferable a digital image, that is the basis for the promotion content 8 displayed on the display 4. The image generator 14 retrieves the viewing preferences of that viewer (e.g., a member of a family) the control device 10 determines to be the most likely viewer at this day and that time of day. The control device 10 therefore estimates who is the most likely viewer based on the stored viewing profile. For example, the control device 10 may determine that the viewer is very likely the mother of the family when the display 4 is turned on at 10 a.m. on a weekday, and that the viewer is very likely a child of the family when the display 4 is turned on at 9 a.m. on a Saturday.

The image generator 14 generates a new and updated image, for example, every time a viewer turns the display 4 on. The newly generated image is created for the present viewer. In addition, the image generator 14 provides that in accordance with the present invention the promotion content 8 appears on the display 4. The system 1 may be configured so that the promotion content 8, which is viewer specific, appears immediately when a viewer turns on the display 4. In an alternative embodiment, the system 1 may be configured so that the promotion content 8 appears at the beginning and, if the viewer does not select it, randomly at later times. Thus, as soon as the display 4 is turned on, the viewer immediately sees the promotion content 8 that leads the viewer to a preferred program, in particular to the premium content, without the need to study a voluminous program guide and without the inconvenience of first "zapping" through a variety of channels to find a preferred content.

Figure 2:
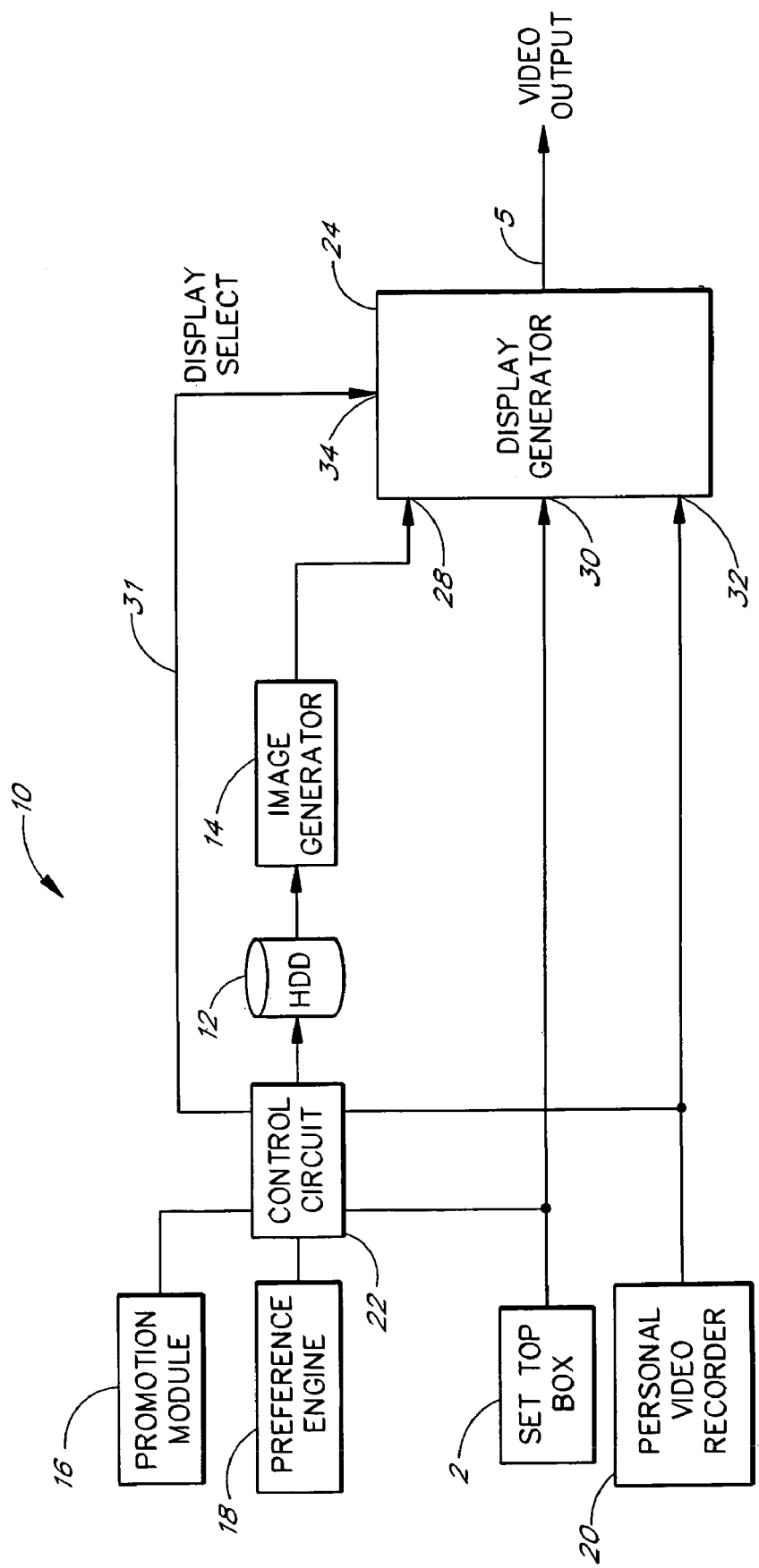
FIG. 2 schematically illustrates an exemplary embodiment of a control device included in the system of FIG. 1 that includes the promotion module, a control circuit, a storage device, an image generator and a display generator, wherein the image generator generates an image of the promotion content to be displayed on the display.

FIG. 2 schematically illustrates an exemplary embodiment of the control device 10 included in the system 1 of FIG. 1. As illustrated, the control device 10 is coupled to the set top box 2 and the personal video recorder 20. In addition to the components described with reference to FIG. 1 (i.e., the storage device 12, the image generator 14, the promotion module 16 and the preference engine 18), the control device 10 includes a control circuit 22 and a display generator 24. The control circuit 22 generally controls the operation of the control device 10 in accordance with the present invention and may be a microprocessor. The control circuit 22 is coupled to the set top box 2, the personal video recorder 20, the promotion module 16, the storage device 12 and the preference engine 18. The image generator 14, the set top box 2 and the personal video recorder 20 are connected to inputs 28, 30 and 32, respectively, of the display generator 24. The display generator 24 is responsive to a DISPLAY SELECT signal on a line 31 applied to a select input 34 to selectively couple one of the inputs 28, 30, 32 to a VIDEO OUTPUT signal on the line 5 connected to the display 4. The DISPLAY SELECT signal is controlled by the control circuit 22.

As described above, the storage device 12 stores data representing the viewer's viewing preferences. When the control circuit 22 activates the image generator 14, the control circuit 22 also enables the image generator 14 to access and retrieve data from the storage device 12. The control circuit 22 further controls the storage device 12 to enable the storage device 12 to store new data to update the data stored on the storage device 12. For example, the preference engine 18 may communicate with the storage device 12 and may update the data under control of the control circuit 22.

The image generator 14 retrieves the data for the present viewer from the storage device 12 and generates the digital image that forms the basis of the display 4 with the promotion content 8. The image generator 14 "builds" the digital image in accordance with conventional techniques.

As set forth above, the display generator 24 is connected to the image generator 14 and receives the digital image from the image generator 14 at the input 28. The display generator 24 converts the digital image from the image generator 14 into a signal format that can be displayed on the display 4. For instance, the signal format may be in accordance with known video/television formats such as NTSC, PAL, S-Video or the like. Thus, when the DISPLAY SELECT signal selects the input 28, the display generator 24 outputs the converted signal from the image generator 14 to the line 5 and thus to the display device 4.

In one embodiment, when the viewer turns the display 4 on, the control circuit 22 automatically selects the input 28 that couples the converted signal from the image generator 14 to the output of the display generator 24 so that the display 4 can receive the generated signal and display it as the promotion content 8. Once the viewer selects the promotion content 8, the control circuit 22 selects one of the other inputs 30 or 32 to couple one of the set top box 2 or the personal video recorder 20 to the display 4.

Figure 3:
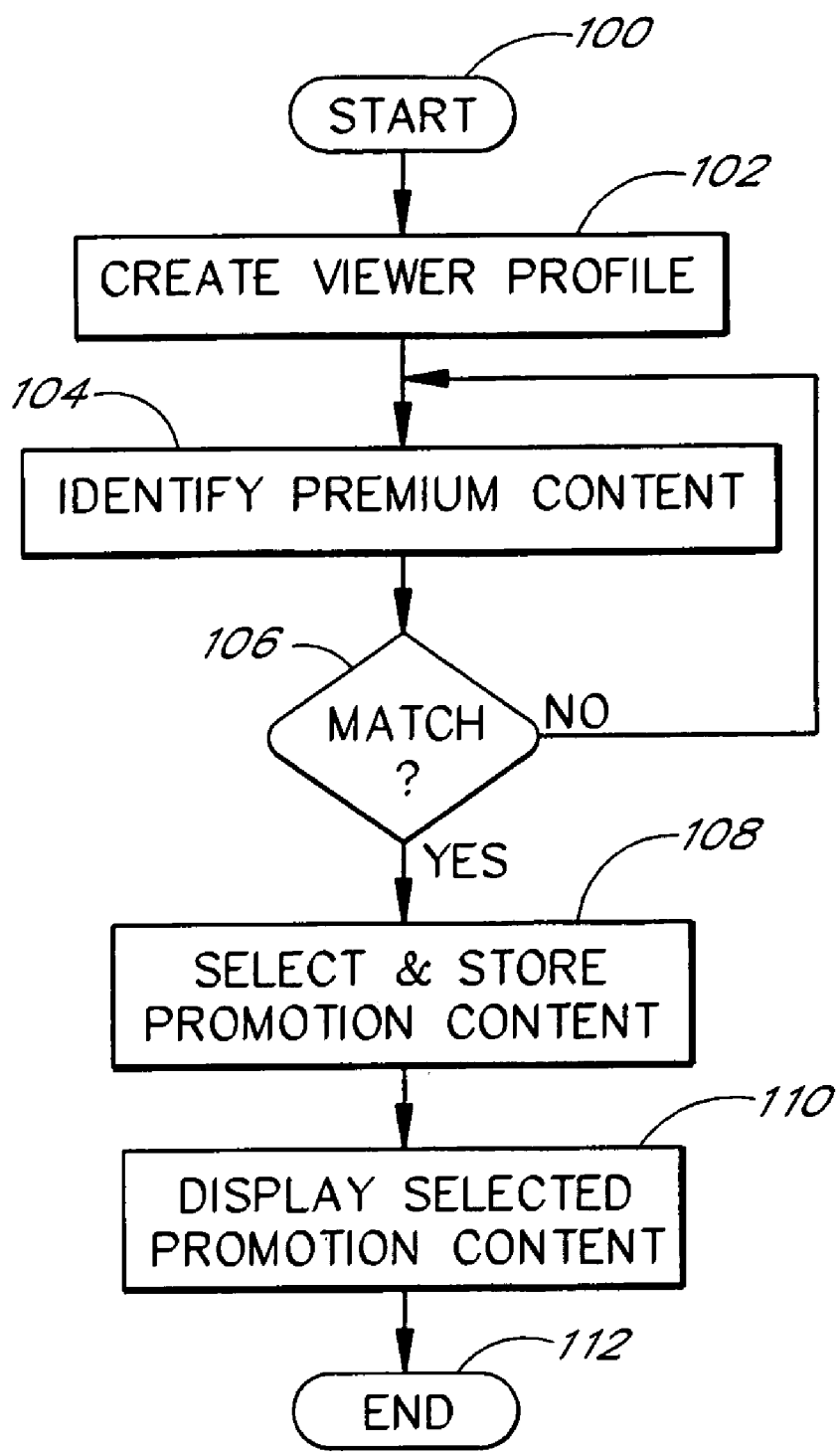
FIG. 3 is a flow chart of a method in accordance with an embodiment of the present invention that creates a viewer profile, identifies premium content, selects and stores promotion content and displays a selected promotion content.

FIG. 3 is a flow chart of a procedure illustrating the method in accordance with the present invention. The method provides for the display of the promotion content 8 on the display 4 when a viewer initiates a viewing session. Thus, whenever a viewer turns the display 4 on, this viewer sees the promotion content 8 intended to entice the viewer to select one of the premium contents.

In a step 100, the procedure initializes the system 1 and executes routine procedures to determine whether the system 1 is operating and properly connected. Further, the routine procedures determine the available storage capacity of the storage device 12.

In a step 102, the method creates a viewer profile representing viewing preferences of a viewer. The viewing preferences are determined by tracking a viewer's selections of the video data and stored, for example, on the storage device 12. For example, the preference engine 18 coupled to the set top box 2 tracks the channels and programs actually selected by a viewer.

In a step 104 and a step 106, the method identifies at least one of the premium contents consistent with the viewer profile. That is, the method determines whether the (incoming) video data includes at least one premium content which the viewer usually watches. As indicated in the step 106, if the video data does not include a premium content that matches the viewer profile, the method returns along the NO branch to the step 104. However, if the video data includes a premium content that matches the viewer profile, the method proceeds along the YES branch to a step 108.

In the step 108, the method selects a promotion content that is associated with the identified at least one of the premium contents. The promotion content may be a video clip as described above. Further, the method stores the selected promotion content.

In a step 110, the method displays the selected promotion content to entice the viewer to watch the associated at least one of the premium contents. The procedure ends at a step 112.

As discussed above, the viewer controls at least the set top box 2 through the remote control 6. As illustrated in FIG. 1 by way of example, the remote control 6 communicates with the personal video recorder 2 via a wireless link that conveys control signals using infrared (IR) light. Remote controls and their various functions are generally known in the art. In particular, it is known that IR light is modulated with a specific command, e.g., channel up or down, volume up or down, select a function, and the like, and that the controlled device detects and processes the modulated IR light to execute the command in the controlled device. The control device 10 processes the viewer's selection and controls the system 1 appropriately.

Those skilled in the art will appreciate that the functionalities of the set top box 2, the personal video recorder 20, and the control device 10 may be integrated into one housing and that, for example, the personal video recorder 20 and the control device 10 may share one storage device 12 having an appropriate storage capacity to store compressed video data and the viewing preferences.

What is claimed is:

1. A video system, comprising:
   an input port configured to receive video data from a head end, the video data including a plurality of premium contents;
   an output port configured to couple to a video display for displaying video data selected by a viewer;
   a preference engine coupled to the input port and configured to track viewer selections of the video data and to create a viewer profile representing viewing preferences of the viewer;
   a personal video recorder configured to locally store premium content from the plurality of premium contents;
   a local storage device; and
   a promotion module coupled to the preference engine and the output port, the promotion module responsive to the viewer profile to select at least one preferred promotion content from the plurality of premium contents, to cause the selected at least one preferred promotion content to be stored on the local storage device, and to cause the selected at least one preferred promotion content to be retrieved from the local storage device and displayed to entice the viewer to select for viewing previously locally stored premium content associated with the selected at least one preferred promotion content.

2. The video system of claim 1, further comprising a set-top box coupled to the input port and configured to receive video data.

3. The video system of claim 1, wherein the plurality of premium contents received from the head end includes a plurality of conditional access video contents.

4. The video system of claim 3, wherein the plurality of conditional access video contents is provided through a pay-per-view service.

5. The video system of claim 1, wherein the promotion module causes display of the selected at least one preferred promotion content as a content selected from a group consisting of a video clip, a trailer, a program title, program actors and their pictures, a program description and program reviews.

6. The video system of claim 3, further comprising a first module configured to scramble at least one of the conditional access video contents received from the head end, wherein the personal video recorder locally stores the at least one scrambled conditional access video content.

7. The video system of claim 6, further comprising a second module configured to de-scramble the at least one locally stored scrambled conditional access video content upon fulfillment of a condition for access.

8. The video system of claim 7, wherein the condition for access is payment of a fee.

9. The video system of claim 1, wherein the promotion module is configured to cause a plurality of sets of data to be stored on the local storage device, each set of data including a viewer profile and at least one preferred promotion content associated with the viewer profile.

10. The video system of claim 9, wherein the promotion module uses the viewer profiles to select a set of data from the plurality of sets of data upon determining which viewer is likely to watch at a given day and time.

11. The video system of claim 1, wherein the personal video recorder comprises the local storage device.

12. The video system of claim 1, wherein the local storage device comprises a hard disk drive within the promotion module.

13. A method of operating a video system that receives video data that includes a plurality of premium contents, the method comprising:
   creating a viewer profile representing viewing preferences of a viewer;

identifying premium content from the plurality of premium contents consistent with the viewer profile;

locally storing the identified premium content;

selecting a promotion content associated with the identified, locally stored premium content;

storing the selected promotion content on a local storage device; and retrieving the selected promotion content from the local storage device and displaying the selected promotion content to entice the viewer to select for viewing the identified, previously locally stored premium content.

14. The method of claim 13, wherein displaying the selected promotion content occurs upon determining that the viewer is watching video data displayed on a video display.

15. The method of claim 13, further comprising retrieving and displaying the identified, previously locally stored premium content corresponding to the displayed selected promotion content upon the viewer selecting the displayed selected promotion content.

16. The method of claim 13, further comprising creating a plurality of viewer profiles, each viewer profile representing viewing preferences of a viewer and including at least one preferred promotion content selected in accordance with the viewing preferences of the viewer.

17. The method of claim 16, further comprising selecting a viewer profile from the plurality of viewer profiles upon determining which viewer is likely to be watching at a given day and time using the viewing preferences.

18. The method of claim 13, wherein the plurality of premium contents includes at least one conditional access video content.

19. The method of claim 18, wherein the at least one conditional access video content includes a pay-per-view content.

20. The method of claim 18, further comprising scrambling the at least one conditional access video content prior to locally storing it.

21. The method of claim 20, further comprising descrambling the scrambled locally stored conditional access video content upon fulfillment of a condition for access.

22. The method of claim 21, wherein the condition for access is payment of a fee.

23. The method of claim 13, wherein displaying of the selected promotion content includes displaying the selected promotion content as a content selected from a group consisting of a video clip, a trailer, a program title, program actors and their pictures, a program description and program reviews.

24. The method of claim 13, wherein the locally stored premium content is stored on a personal video recorder which comprises the local storage device.

25. The method of claim 13, wherein the local storage device comprises a hard disk drive.

* * * * *